Patented May 20, 1941

2,242,228

UNITED STATES PATENT OFFICE 2,242,228

METHOD OF MAKING CALCIUM CARBONATE

Donald B. Bradner, Hamilton, Ohio, assignor to The Champion Paper and Fibre Company, Hamilton, Ohio, a corporation of Ohio No Drawing. Application February 9, 1939, Serial No. 255,534

9 Claims. (Cl. 23—66)

This invention relates to methods of making calcium carbonate; and it comprises a method of making precipitated calcium carbonate in finely divided form and particularly adapted for paper coating, wherein an aqueous suspension of hydrated lime is carbonated by passing carbon dioxid gas therein in the presence of a predetermined small modicum of a substance adapted to control the crystal growth of the calcium carbonate formed during carbonation and prevent conversion into undesirable forms, said substance usually being calcium sulfate; all as more fully hereinafter set forth and as claimed.

This application is a continuation-in-part of my prior application Serial No. 2,421, filed January 18, 1935.

Calcium carbonate prepared by most wet methods is regarded as a desirable component of paper coating compositions because of its whiteness, but it has found little use since in the usual grades available it does not give a coating which after the calendering exhibits a smooth even surface. This I ascribe to the development of undesirable crystal forms during the crystallization actions incident to its formation. In the usual methods crystal growth is irregular and apparently particles of undesirable physical forms and non-uniform sizes are produced.

One object of my invention is to produce precipitated calcium carbonate as a uniform, regular, fine-grained product of desirable physical characteristics particularly suitable for use in paper coating, paper filling, etc., by carbonation of milk of lime, while controlling the crystal growth of the calcium carbonate during precipitation; regulating the crystal growth as to size, character, and uniformity. The product is uniform in the sense that outsized particles are absent. A more regular and uniform coating can thus be secured.

In the present invention, a suspension of hydrated lime in water is first prepared by usual methods. The concentration of the suspension or slurry is determined by practical requirements. It should be thin enough to be easily pumped. To this slurry is added a material adapted to control the crystal growth of calcium carbonate; to hinder development of undesirable physical forms. One particularly useful agent is calcium sulfate, in the form of ground gypsum. This may be added to the slurry in dry, powdered form or as an aqueous suspension and thoroughly mixed with the slurry. Other forms of calcium sulfate also can be used. In place of calcium sulfate, I can use other inorganic materials having the same effect, such as barium hydroxid, ammonium chlorid, sodium sulfate, or aluminum chlorid. All these bodies affect the crystal development of calcium carbonate and all tend towards the production of a desirable physical form of carbonate. The amount added is always a minor proportion, usually from 1 to 10 per cent by weight on the lime, on the dry basis. The slurry is then carbonated, advantageously with gaseous carbon dioxid. The carbonation is advantageously carried out in a tower, in counter-current, gases passing upward against downflowing slurry with a return of slurry from bottom to top, the liquid being recycled as long as necessary. The reaction normally takes several hours. Pure $CO_2$ gas, or inert gases containing it, can be used. The concentration of $CO_2$ should be sufficiently high to allow the carbonation to be completed within a reasonable length of time. Clean flue gas is satisfactory. No special regulation of temperature is required. Cooling is not necessary. The carbonation is carried on to completion, the end of the reaction being determined by phenolphthalein as indicator. Advantageously, the passage of gas into the slurry is continued a little while after the reaction is indicated as complete by disappearance of alkalinity. The product is then filter-pressed to remove water.

In a specific example of the invention, 12,000 pounds of quicklime were slaked with hot water and made up with water to 12,800 gallons in a tank provided with an agitator. To the suspension were added 360 pounds of calcium sulfate in the form of ground gypsum. The calcium sulfate and lime suspension were mixed thoroughly. The suspension was then screened through a 120-mesh screen. The screened suspension was introduced into a wooden tower of the usual slat construction, about 13 feet high and 4½ x 5 feet at the base, and recirculated therethrough at the rate of 2500 gallons per minute. Washed flue gas containing 13.5 per cent carbon dioxid was introduced into the tower at the bottom at the rate of about 4000 cubic feet per minute. The temperature of the reaction remained at about 130° F. No special effort was made to control temperature. After 12 hours, the liquor became neutral to the phenolphthalein test. The carbonation was continued for another hour. The suspension was then drawn off and filtered.

The product is characterized by being in a very fine and regular state of subdivision, and being in a physical form adapting it, when mixed with adhesive and coated on a paper web, to give a smooth-surfaced high grade coated paper.

Calendering produces a smooth uniform surface.

In this example, the other agents mentioned can be substituted for the calcium sulfate, with similar results. The explanation for the action of calcium sulfate and the other agents may be that they interfere or inhibit growth of the calcium carbonate formed in the carbonation into undesirable forms. Whatever may be the explanation, the method described produces an improved product of outstanding value in paper coating. In the method, considerable latitude is afforded in the conditions of precipitation. The improved product can be produced under wide variations in temperature, concentrations, etc.

It is not greatly important that the agent used to control the calcium carbonate particle size be added after the lime is slaked. In some cases the agent, e. g., calcium sulfate may be added to the lime before slaking or to a limestone before calcining, or the desired quantity of calcium sulfate may be obtained by blending suitable limestones, one or more of which contains calcium sulfate. It is also within the scope of the invention to form the calcium sulfate in situ as by adding sulfuric acid or sulfur trioxide to the lime; either to the lime before burning, or to the burnt lime, or to the hydrated lime.

A good calcite lime high in CaO is advantageous in the present process, although dolomite lime can be used.

What I claim is:

1. A method of making precipitated calcium carbonate preparations in finely divided form by carbonation of hydrated lime to obtain a product in physical form useful in paper coating to give a uniform, smooth surface after calendering, which comprises admixing with an aqueous suspension of hydrated lime a modicum of an inorganic substance adapted to regulate and make uniform the growth of the calcium carbonate formed during carbonation, said substance being selected from the class consisting of the chlorids of aluminum and ammonium, the sulfates of calcium and sodium, and barium hydroxid, passing carbon dioxid gas therein until the lime is completely changed to carbonate, and filtering.

2. A method of making precipitated calcium carbonate preparations in finely divided form by carbonation which comprises forming an aqueous suspension of hydrated lime, adding thereto a modicum of a substance adapted to regulate and make uniform the growth of calcium carbonate particles, said substance being selected from the class consisting of the chlorids of aluminum and ammonium, the sulfates of calcium and sodium, and barium hydroxid, and passing carbon dioxid gas into the mixture until reaction with formation of calcium carbonate is substantially complete.

3. A method of making precipitated calcium carbonate preparations in finely divided form by carbonation which comprises forming an aqueous suspension of hydrated lime, admixing therewith a modicum of the order of 1 to 10 per cent of an inorganic substance adapted to regulate and make uniform the growth of calcium carbonate particles, said substance being selected from the class consisting of the chlorids of aluminum and ammonium, the sulfates of calcium and sodium, and barium hydroxid, and passing carbon dioxid gas into the mixture until substantially complete carbonation of the lime is secured.

4. A method of making precipitated calcium carbonate in finely divided form, which comprises passing carbon dioxid into an aqueous suspension of hydrated lime to which has been added calcium sulfate to the extent of from 1 to 10 per cent based on the lime.

5. A method of making a precipitated calcium carbonate preparation in finely divided form by carbonation of hydrated lime to obtain a product in physical form useful in paper coating to give a coating having a uniform, smooth surface after calendering, wherein an aqueous suspension of hydrated lime is carbonated by passing carbon dioxid gas therein in the presence of a small, constant modicum of added calcium sulfate adapted to regulate and make uniform the growth of the calcium carbonate formed during the carbonation.

6. A method of making precipitated calcium carbonate preparations in a particular finely divided form, making it adapted for use in paper coating compositions, which comprises passing carbon dioxid gas into an aqueous suspension of hydrated lime containing a controlled, predetermined proportion, between one and ten per cent, of calcium sulfate, as such, in amount sufficient to regulate and make uniform the growth of calcium carbonate particles.

7. A method of making precipitated calcium carbonate preparations in finely divided form, adapted for use in paper manufacture, which comprises passing carbon dioxid gas into an aqueous suspension of hydrated lime in the presence of a small, predetermined, controlled proportion of a substance in sufficient quantity to regulate and make uniform the growth of calcium carbonate particles, said substance being selected from the class consisting of the chlorids of aluminum and ammonium, the sulfates of calcium and sodium, and barium hydroxide.

8. A method of making precipitated calcium carbonate preparations in finely divided form which comprises passing carbon dioxid gas into an aqueous suspension of hydrated lime in the presence of a small added modicum of a substance adapted to regulate and make uniform the growth of the calcium carbonate particles, said substance being selected from the class consisting of the chlorids of aluminum and ammonium, the sulfates of calcium and sodium, and barium hydroxid.

9. A method of making precipitated calcium carbonate preparations in finely divided form which comprises passing carbon dioxid gas into an aqueous suspension of hydrated lime containing a controlled predetermined proportion, between 1 and 10 per cent, of added calcium sulfate so as to regulate and make uniform the growth of calcium carbonate particles.

DONALD B. BRADNER.